United States Patent [19]

MacGregor et al.

[11] Patent Number: 4,948,514
[45] Date of Patent: Aug. 14, 1990

[54] METHOD AND APPARATUS FOR SEPARATING IONS FROM LIQUIDS TO PRODUCE SEPARATE DILUTED AND CONCENTRATED EFFLUENTS

[75] Inventors: Douglas MacGregor, Salt Lake City, Utah; Mark A. Smith, Boulder, Colo.

[73] Assignee: Lion Capital, Ltd, Denver, Colo.

[21] Appl. No.: 248,781

[22] Filed: Sep. 23, 1988

[51] Int. Cl.$^5$ .................... C02F 1/46; B01D 35/06
[52] U.S. Cl. .................... 210/748; 210/321.72; 210/321.78; 204/151; 204/186; 204/260; 204/272
[58] Field of Search ............... 210/222, 223, 695, 748, 210/321.72, 321.78; 204/180.1, 186, 299 R, 151, 152, 272, 302, 260

[56] References Cited

U.S. PATENT DOCUMENTS

| | | | |
|---|---|---|---|
| 3,719,583 | 3/1973 | Ustick | 210/695 |
| 3,893,898 | 7/1975 | Candor | 204/183.1 |
| 3,966,575 | 6/1976 | Candor | 204/299 R |
| 3,975,257 | 8/1976 | Hulse | 204/182.2 |
| 4,057,482 | 11/1977 | Candor | 204/299 R |
| 4,426,261 | 1/1984 | Fushihara | 204/151 |
| 4,552,664 | 11/1985 | Benner | 210/222 |

FOREIGN PATENT DOCUMENTS 3031673 4/1982 Fed. Rep. of Germany ...... 210/695

Primary Examiner—W. Gary Jones
Assistant Examiner—Matthew O. Savage

[57] ABSTRACT

A method and apparatus are disclosed for separating ions from a liquid through use of static fields generated by permanently polarized members which cooperate with membranes that act as mechanical inhibitors in encouraging positive ions to remain within a positive region of the apparatus and negative ions to remain within a negative region of the apparatus, thereby leaving a relatively ion-free effluent in a neutral region of the apparatus. The ions are separated through static electrical fields, which are permanently generated by the polarized material.

16 Claims, 1 Drawing Sheet

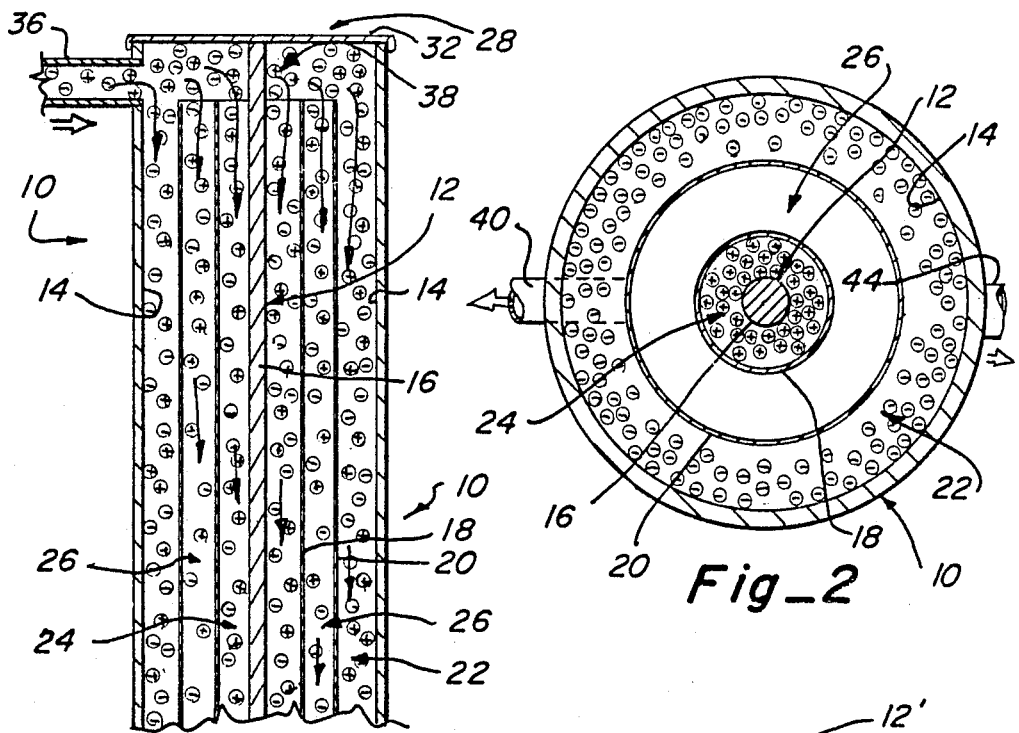
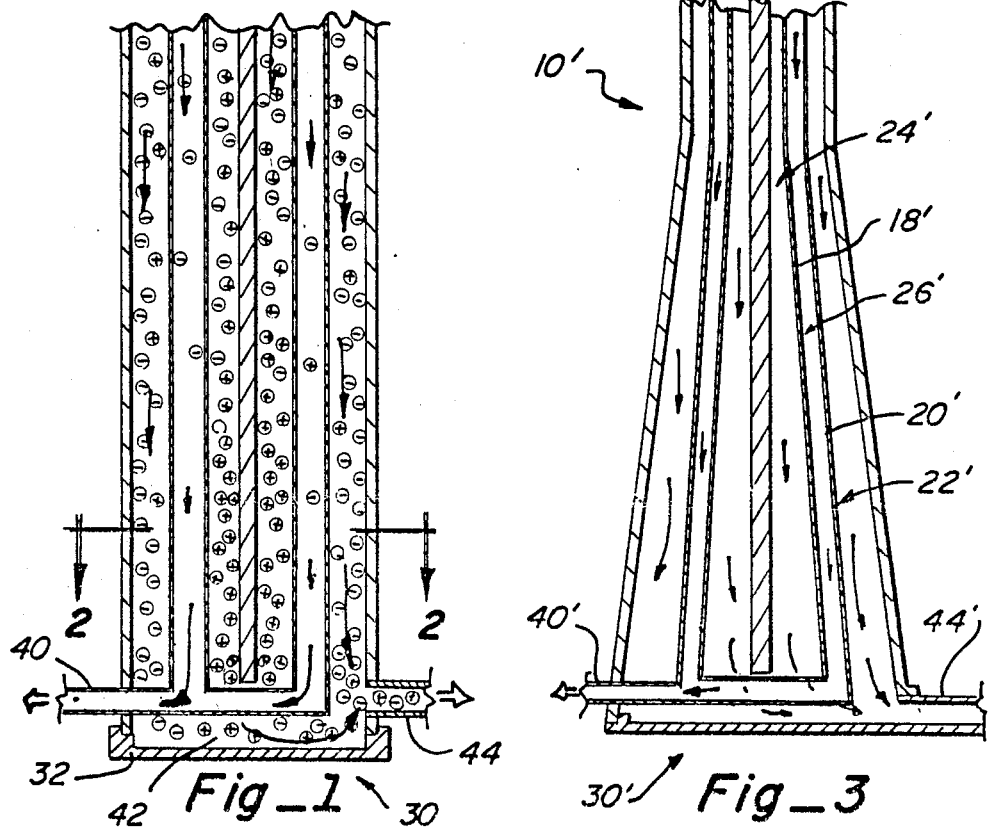

METHOD AND APPARATUS FOR SEPARATING IONS FROM LIQUIDS TO PRODUCE SEPARATE DILUTED AND CONCENTRATED EFFLUENTS

BACKGROUND OF THE INVENTION

1. Field of the Invention

The present invention relates generally to the separation of designated ions from liquids and has particular use in the desalination of water and in the concentration of dissolved salts in a confined effluent.

2. Description of the Prior Art

The separation of identified ions from a liquid containing those ions has been of interest for many years in connection with various processes. One of these processes is the desalination of water. Another would be the concentration of dissolved salts for use in other economical processes.

Currently, there are five basic techniques that are known and can be used to separate salt and other such dissolved solids from water and these include distillation, reverse osmosis, electrodialysis, ion exchange, and freeze desalination. Distillation and freezing involve removing pure water, in the form of water vapor or ice, from a salty brine. Reverse osmosis and electrodialysis use membranes to separate dissolved salts and minerals from water, while ion exchange involves an exchange of dissolved mineral ions in the water for other, more desirable dissolved ions as the water passes through chemical "resins." A more particular description of each of these techniques is as follows:

Distillation

Salt and mineral-free water can be separated from seawater by vaporizing some of the water from the salt solution and then condensing this water vapor on a cooler surface. This is the same phenomenon that occurs when water vapor or steam inside a warm house condenses on a cold windowpane, or when water vapor condenses to form rain or snow. The vaporization of water molecules can be accelerated by heating the brine to its boiling point and/or reducing the vapor pressure over the brine.

Reverse Osmosis

With reverse osmosis, salty water on one side of a semipermeable membrane is typically subjected to moderate pressures. Pure water will diffuse through the membrane leaving behind a more salty concentrate containing most of the dissolved organic and inorganic contaminates. Reverse osmosis membranes are manufactured commonly in the form of hollow, hair-like fibers or several alternating layers of flat sheet membranes and open spacer fabric which is rolled into a spiral configuration. Membrane selection depends largely on feed water characteristics and membrane costs.

Electrodialysis

With this technique, brackish water is pumped at low pressures between flat, parallel, ion-permeable membranes that are assembled in a stack. Membranes that allow cations to pass through them are alternated with anion-permeable membranes. A direct electrical current is established to cross the stack by electrodes positioned at both ends of the stack. This electric current pulls the ions through the membranes and concentrates them between each alternate pair of membranes. Partially desalted water is left between each adjacent set of membrane pairs. Scaling of the membrane to remove accumulated salt is avoided in most electrodialysis units by operationally reversing the direction of the electrical current around the stacks at predetermined intervals. This reverses the flow of ions through the membranes, so that the spaces collecting salty concentrate begin collecting less salty product water.

Ion Exchange

In this process, undesirable ions in the feedwater are exchanged for desirable ions as the water passes through granular chemicals, called ion exchange resins. Both cation and anion exchange resins are used by industry. For example, cation exchanged resins are typically used in homes and municipal water treatment plants to remove calcium and magnesium ions in "hard" water, and by industries in the production of ultra-pure water. The higher the concentration of dissolved solids in the feedwater, the more often the resins will need to be replaced or regenerated.

Freeze Desalination

When salt water freezes, the ice crystalizes as a pure material leaving the dissolved salt and other minerals in pockets of higher salinity brine. Traditional freezing processes involve five steps: (1) precooling of the feedwater, (2) crystalization of ice into a slush, (3) separation of ice from the brine, (4) washing the ice, and (5) melting the ice. New research efforts are attempting to reduce the number of steps, especially the need to wash the ice crystals.

The afore-noted techniques for separating salt and other dissolved solids from water have met with various degrees of success. With the exception of the ion-exchange technique, each of the other known techniques for desalinating water have the drawback of requiring a considerable amount of energy and thus expense to operate the system. In the case of the ion-exchange technique, chemicals are needed which add to the expense of operating the process.

It is a primary object of the present invention to provide a new and improved method of separating salt or other ions from liquids in a relatively inexpensive manner to provide diluted and concentrated effluents.

It is another object of the present invention to utilize a totally new concept for separating ions from liquids which overcomes the shortcomings of the prior art techniques.

SUMMARY OF THE INVENTION

The present invention is directed to a new technique for separating and concentrating ions from liquids by utilizing static field forces to attract the ions and create separate liquid streams, one of which is free or substantially free of such ions and the other of which constitutes a concentrated solution of the ions.

The system utilizes permanently polarized materials such as electrets to create static fields through which a flow of the liquid passes. The fields attract ions of an opposite charge, and are believed to cause them to move as the liquid flows through the field thereby encouraging the ions to move out of a mainstream into an area adjacent the polarized materials. In order to retain a separation of the ions from the mainstream of the liquid, membranes through which the ions can pass under the influence of the static fields are utilized to define positive and negative regions where the ions are believed to accumulate and a clean or neutral region where the liquid, which is substantially free of the ions, can be removed and collected.

The method and apparatus of the present invention have the advantage of utilizing permanently polarized materials which do not require continuous energy input, filters or chemicals which would add cost to the operation of a system incorporating the method and apparatus.

Other aspects, features and details of the present invention can be more completely understood by reference to the following detailed description of the preferred embodiments, taken in conjunction with the drawings, and from the appended claims.

BRIEF DESCRIPTION OF THE DRAWING

FIG. 1 is a vertical section taken through a first embodiment of the apparatus of the present invention and diagramatically illustrating the movement of ions in the liquid being processed.

FIG. 2 is an enlarged section taken along line 2—2 of FIG. 1.

FIG. 3 is a fragmentary vertical section taken through the lower portion of an alternative embodiment to that illustrated in FIG. 1.

DESCRIPTION OF THE PREFERRED EMBODIMENT

The method and apparatus of the present invention for separating ions from liquids to produce separate diluted and concentrated effluents operates on a principle that is quite distinct from any system utilized in the prior art. The method and apparatus utilize permanently polarized bodies to establish static electric fields through which the liquid passes whereby the ions will be subjected to the effects of the fields and be caused to be moved perpendicularly to the flow of the liquid stream. One of the obvious advantages in a method or apparatus of this type, wherein permanently polarized materials are used to attract free ions in the liquid, is that no power is needed to operate the system other than the possibility of having to operate a pump to move the liquid through the system. It will be appreciated with the description that follows that the apparatus could be placed in a naturally moving flow of liquid even though in such cases filters may be required to prevent the flow of debris into the system which might clog or damage the apparatus.

In essence, the method and apparatus of the present invention depends upon the motion of a charged particle in a static electrical field. As a charged particle flows through a static field, it is attracted to the area of the field which is opposite in charge to its own charge, and if the field exists between two bodies, the ion is attracted to the body of opposite charge. This phenomenon depends on capacitive rather than conductive properties of the ions since the ions are not neutralized as would be the case in an electrodialysis system. Rather, the ions retain their charge during the entire process.

The method and apparatus of the present invention utilize fields generated by permanently polarized bodies such as electrets. As the liquid flows between the bodies, the ions are believed to move through the field toward the body having an opposite charge. This is also true if the liquid is not flowing. The ions thus tend to concentrate in areas adjacent to the polarized bodies leaving a middle or neutral area in which there are few ions. By removing liquid from the middle area, a clean liquid is attained at minimal expense. Similarly, liquid removed from the concentrated areas can be joined thereby creating a concentrated solution of the ions.

While there would be many physical embodiments of apparatus capable of functioning in accordance with the teachings of the present invention, one preferred embodiment of such an apparatus is illustrated in FIGS. 1 and 2. It will therein be appreciated that the apparatus of the present invention includes an outer tubular body or member 10 that is of hollow construction and in which is disposed a central tubular body or member 12 which in the disclosed embodiment is of solid configuration. Both the outer and inner tubular members are polarized so that the inner surface 14 of the outer member 10 generates a field attracting ions having a negative charge and the outer surface 16 of the inner member 12 generates a field attracting ions having a positive charge. However, it is believed that an opposite relationship would function just as well. For purposes of the description of the preferred embodiments, the tubular members are electrets. An electret is a dielectric material that has been permanently polarized thereby creating static electric fields associated with the polarized regions of the material. The static fields are believed to be effective in attracting ions in a liquid passing between the two tubular members 10 and 12 such that any negative ions will tend to congregate adjacent to the outer tubular member having the inner surface 14 thereof positively charged, and the positive ions will tend to congregate adjacent to the inner tubular member which has its outer surface 16 negatively charged.

Inner and outer hollow cylindrical membranes 18 and 20 respectively are disposed in the system between the outer and inner tubular members 10 and 12 respectively. The membranes define a negative region 22 between the outer membrane 20 and the outer tubular member 10, a positive region 24 between the inner membrane 18 and the inner tubular member 12 and a neutral or clear region 26 between the two cylindrical membranes 18 and 20.

The inner and outer cylindrical membranes 18 and 20 are supported within the system in any suitable manner such that the terminal ends of the membranes fall short of the ends of the outer tubular member. The apparatus has an inflow end 28 at the top as illustrated in FIG. 1 and an outlet end 30 at the bottom. End caps 32 are provided over opposite ends of the outer tubular member 10 to enclose the system. At the inlet or inflow end 28 of the apparatus, an inlet tube 36 communicates with an inflow region 38 which functions as an inlet manifold through which the liquid can flow into the neutral, negative and positive regions of the apparatus. At the outflow end 30 of the apparatus, however, the neutral region of the apparatus is connected to an effluent conduit 40 for removal of liquid which has been relieved of the positive and negative ion content. The negative and positive regions 22 and 24 respectively of the apparatus at the outflow end 30 are in communication with a concentrated outflow region 42 which has an outflow conduit 44 for removing concentrated liquid which includes most of the positive and negative ions.

Both the inner and outer membranes 18 and 20 respectively can be made of an identical material having a pore size such that the ions in the neutral region which are under the influence of the static fields created by the polarized tubular members, will be drawn through the membranes toward the surface of the tubular member which is oppositely charged. As mentioned previously, it is believed that the negative ions migrate outwardly through the outer membrane 20 into the negative region 22 adjacent the positively charged inner surface of the outer tubular member 10, and the positive ions migrate inwardly through the inner membrane 18 into the positive region 24 adjacent the negatively charged surface of the inner tubular member 12. The membranes define mechanical barriers which discourage the ions from remixing in the neutral region 26 thereby permitting the liquid in the neutral region to remain relatively free of the ions which were contained in the inflowing liquid.

The field forces which are believed to influence the ionic motion are essentially weak forces and therefore it is important to minimize mixing forces which might tend to redistribute the ions in the neutral region 26 of the apparatus. Based on experimentation, best results have been obtained when the Reynolds Number of the flow was below 10,000. It will be appreciated that the surface texture of the membrane material is important to the smooth passage of liquid through the apparatus as coarse surfaces and the like generate undesired turbulence. Thin hydrophyllic plastic with pore sizes of approximately 5 microns or more have given best results in early testing of the desalination of water. The surfaces of such material is smooth so as to introduce a minimum of turbulence to the flow stream. Membranes of this type can be obtained from the Millipore Corporation of Bedford, Mass.

As mentioned previously, the tubular members 10 and 12 can be electrets. While many materials such as waxes, particularly carnauba wax might be suitable, the most suitable material so far tested is felt to be polytetrafluoroethane (PTFE).

The spacing between the polarized tubular members 10 and 12 is also important to an efficient separation of ions from the liquid in that the static fields generated by the polarized members get weaker the further from the member they extend and the strength of the static fields is important to an effective separation of the ions from the inflowing liquid.

In early testing, optimal results have been obtained in an apparatus where the inner tubular member 12 had a diameter of 0.5" nom. and the outer tubular 10 had an inner diameter of 2.0" nom. The inner and outer membranes had diameters of 1" and 1.5", respectively. The length of the outer tubular member 10 was 18 ft., and the pore size in both membranes was nominally 5 microns. The inner and outer tubular members were electrets made from PTFE with field strengths of 18,000 volts per cm. While various flow rates were tested, at a flow rate of 1.8 gallons per hour, a three percent sodium chloride solution produced a flow of 1.5 gallons per hour of 5.2 ppm sodium chloride in water for the diluted effluent. The concentrated effluent was 11.8 percent sodium chloride. The inner membrane surface area in the apparatus was 1.18 square feet and the outer membrane surface was 2.35 square feet.

An alternative embodiment of the present invention is illustrated in FIG. 3 with like parts having been given like reference numerals with a prime suffix. In this embodiment the apparatus is substantially similar to that illustrated in FIGS. 1 and 2 except that the lower third of the outer tubular member 10' and the two cylindrical membranes 18' and 20' are flared radially outwardly so as to increase the overall diameter of the apparatus by approximately 50 percent. The outer tubular member 10' and the two cylindrical membranes 18' and 20' are flared such that the neutral region 26' remains substantially the same in cross-sectional area throughout the length of the apparatus while the negative and positive regions 22' and 24' respectively increase progressively in size through the lower third of the apparatus. In this manner, enlarged positive and negative regions are provided for the accumulation of positive and negative ions. The enlarged regions are provided due to the belief that as the ions accumulate, they build up a charge which discourages the entry of additional ions into the charged volume. The enlarged regions therefore help to discourage remixing of the ions in the neutral region 26' by providing a larger space for their accumulation.

The lower or effluent end 30' of the apparatus is similar to the first described embodiment in that the neutral region communicates with an outflow tube 40' for removing clarified liquid from the apparatus while the positive and negative regions communicate with an outflow tube 44' for removal of an effluent that is concentrated with the positive and negative ions.

The method of the present invention includes the steps of providing a liquid having free ions therein, exposing the liquid to spaced static fields on opposite sides of the liquid with one static field attracting positive ions and the other static field attracting negative ions, and subsequently separating the liquid from which the ions have been removed from the liquid containing the concentrated ions.

The method preferably further includes the step of providing divider means, which may be membranes, to establish a positive region in one field, a negative region in the other field, and a neutral region between the divider means, so that liquid from which the ions have been substantially or totally removed will congregate in the neutral region from where it can be separated from the liquid where the ions have been concentrated.

The method preferably also includes the step of establishing a flow of the liquid such that the ions can be removed as the liquid flows through an apparatus designed to conduct the method of the present invention.

It will be appreciated from the foregoing description that a method and apparatus have been described which are not only useful in removing salts or other dissolved solids from a liquid to provide a substantially pure liquid but are also useful in producing concentrated solutions of the salts or other dissolved solids. The ability to produce such concentrated solutions is beneficial in many areas but by way of example would be useful in converting diluted solutions of valuable minerals into concentrated solutions of such minerals from which the minerals can be removed in an economic manner.

Although the present invention has been described with a certain degree of particularity, it is understood that the present disclosure has been made by way of example, and changes in detail or structure may be made without departing from the spirit of the invention, as defined in the appended claims.

We claim:

1. A method of separating charged particles from a liquid to form separate diluted and concentrated effluents of liquid comprising the steps of: passing such a liquid between a first tubular permanently polarized element and a second tubular permanently polarized element disposed within said first element, exposing the liquid to spaced static fields on opposite sides of the liquid with one static field attracting negatively charged particles and the other static field attracting positively charged particles, so that the charged particles are concentrated in said static fields, and subsequently withdrawing liquid from which the charged particles have been removed in one stream and withdrawing liquid in which the charged particles have been concentrated in a second stream.

2. The method of claim 1 further including the step of providing divider means to establish a positive region in said other static field, a negative region in said one static field, and a neutral region between the divider means, said divider means having the characteristic of permitting charged particles to pass therethrough under the influence of the static fields but discouraging the passage of charged particles that are not under the influence of a static field whereby liquid from which the charged particles have been removed will congregate in the neutral region.

3. The method of claim 2 further including the step of establishing a flow of the liquid through the static fields.

4. The method of claim 3 wherein said static fields are created by providing electrets.

5. Apparatus for separating charged particles from a liquid, comprising in combination: flow path means defining a flow path along which said liquid can pass; a first permanently polarized element on one side of said path establishing a field capable of attracting negatively charged particles from said liquid; a second permanently polarized element on a second side of said flow path establishing a field capable of attracting positively charged particles from said liquid; and divider means in said flow path defining a negative region adjacent to said first polarized element, a positive region adjacent to said second polarized element, and a central region, one of said first adjacent to polarized elements being tubular in configuration and defining an outer wall of said flow path means and the other of said first and second polarized elements being tubular in configuration and disposed within said one polarized element to define an inner wall of said flow path means, which flow path means is comprised of said first and second polarized elements, said liquid flowing along said flow path and thereby passing between said first and second polarized elements, whereby said liquid, including positively and negatively charged particles, introduced to said flow path means and allowed to pass therealong so as to be exposed to the fields generated by said first and second polarized elements will be stripped of the negatively and positively charged particles as said particles are attracted to the first and second polarized elements, respectively, and said negatively and positively charged particles will be permitted to accumulate in said negative and positive regions, respectively.

6. The apparatus of claim 5 wherein said divider means constitute membranes having a pore size adequate to permit the passage of positively and negatively charged particles under the influence of the polarized elements while discouraging the passage of the particles through the membranes unless they are under the influence of the polarized elements.

7. The apparatus of claim 6 wherein the pore size of said membranes is approximately 5 microns.

8. The apparatus of claim 6 wherein the pore size of said membranes is at least 5 microns.

9. The apparatus of claim 5 wherein said polarized elements are electrets.

10. The apparatus of claim 5 wherein the first polarized element defines the outer wall of said flow path and the second polarized element defines the inner wall of said flow path.

11. The apparatus of claim 5 wherein the said first and second polarized elements are of cylindrical configuration so that the flow path is also of cylindrical configuration.

12. The apparatus of claim 11 wherein said divider means are cylindrical membranes having a pore size adequate to permit the passage of the positively and negatively charged particles under the influence of the polarized elements while discouraging the passage of the particles through the membranes unless they are under the influence of the polarized elements.

13. The apparatus of claim 12 including means for collecting the liquid in the central region separately from the liquid in the positive and negative regions.

14. The apparatus of claim 11 wherein said flow path means has an inlet and an outlet end wherein one of said first and second polarized elements is generally cylindrical in configuration and defines an outer wall of said flow path, said one polarized element being flared radially outwardly at its outlet end.

15. The apparatus of claim 14 wherein the divider means constitutes membranes which are of cylindrical configuration at the inlet end of the flow path means and are flared radially outwardly at the outlet end of the flow path means such that the negative and positive regions are of greater cross-sectional area at the outlet end than at the inlet end.

16. The apparatus of claim 11 wherein the tubular polarized elements are disposed concentrically relative to one another.

* * * * *

UNITED STATES PATENT AND TRADEMARK OFFICE
CERTIFICATE OF CORRECTION

PATENT NO. : 4,948,514
DATED : August 14, 1990
INVENTOR(S) : Douglas MacGregor, Mark A. Smith It is certified that error appears in the above-identified patent and that said Letters Patent is hereby corrected as shown below:

On the first title of the patent, item [75] in the heading, the word "Inventors:" is changed to "Inventor:", and "Mark A. Smith, Boulder, Colo." is eliminated.

Item [19] "MacGregor et al" should read --MacGregor--.

Signed and Sealed this

Seventeenth Day of March, 1992

*Attest:*

HARRY F. MANBECK, JR.

*Attesting Officer*      *Commissioner of Patents and Trademarks*